May 3, 1927.
A. L. STEWART
1,626,888
SELF GUIDING AND RIDING CULTIVATOR
Filed Feb. 2, 1926
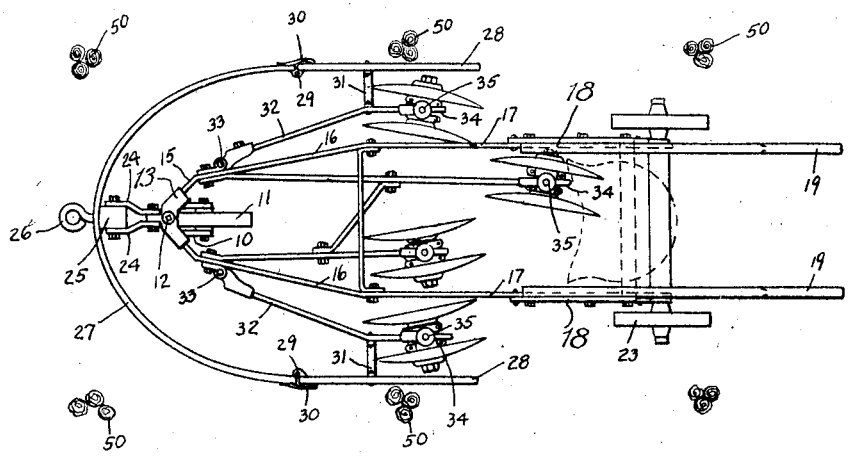
INVENTOR.
ALONZO L. STEWART.
BY
ATTORNEYS.

Patented May 3, 1927.

1,626,888

UNITED STATES PATENT OFFICE.

ALONZO L. STEWART, OF RUSHVILLE, INDIANA.

SELF-GUIDING AND RIDING CULTIVATOR.

Application filed February 2, 1926. Serial No. 85,459.

This invention relates to an agricultural implement for corn fields.

The object of this invention is to provide a cultivating device with an attachment that is relatively adjustable automatically with the adjustability of the device, whereby complete cultivation is possible between rows of corn.

The chief feature of the invention consists in the mounting of a U-shaped corn turning attachment upon a framework, the resultant being of adjustable character, whereby the ends of the corn turning attachment are relatively movable towards and away from each other as required by the spacing of the corn rows.

The full nature of the invention will be understood from the accompanying drawings and the following description and claims:

The figure is a top plan view of the agricultural implement including the corn turning attachment and the cultivating devices.

In the drawings 10 indicates a part of a caster wheel construction 11 having a pintle 12 rotatably mounted in the frame supporting bracket 13. The frame includes members 15, 16 and 17. Rising from each member 17 is an inclined member 18 terminating in the seat supporting handle portions 19.

A pair of straps 24 are suitably connected to a standard 25 from which projects a clevis 26 that extends through an opening in a substantially U-shaped outline corn turning attachment 27, the ends of which are relatively movable towards and away from each other by reason of the hinged arrangement 29. The hinge is protected by the plate 30 mounted adjacent thereto, and the foregoing arrangement not only permits the U-shaped member to be shipped in a collapsed relation and thus occupy less space, but permits the ends 28 to move towards and away from each other which is necessitated by the expansion and contraction relatively of the cultivating device mounted between the ends of the corn turner. The relatively movable ends of the U-shaped corn turner are suitably connected by the brackets 31 to portions of the cultivating device and are movable therewith.

Herein a pair of members extend rearwardly and downwardly as well as outwardly and each is indicated by the numeral 32. The same is hinged at one end as at 33 to the strap 16. Thus members 32 are movable towards and away from each other as required. Each strap 32 supports the connecting strap 31 and terminates in a spindle support 34, the spindle being indicated by the numeral 35.

As shown the agricultural implement is positioned between two corn rows having the stalks 50. Since the corn is planted two rows at a time they will have a predetermined spaced relation which is uniform, but on the return planting trip the distance between the nearest row and the previous row may or may not be uniform. For this reason, therefore the corn turner is provided or arranged so that it is automatically expansible and contractable, reference being had to the ends, with the cultivating devices, the usual cultivating devices whether it be drills or discs, being of such a formation that they are adjustable for said purposes. Upon the last cultivation prior to drilling in certain cases of crop rotation, particularly where corn is followed by wheat, it is necessary that the earth heretofore furrowed, be leveled as well as cultivated. The present invention insures leveling and complete cultivation between the corn rows and heretofore not secured. Complete cultivation is obtained by utilization of a plurality of opposed groups of cultivating devices such as discs, which to insure ease of guiding and uniformity of draft and the like, are inclined to the line of draft at the same angle although oppositely thereto.

The invention claimed is:

1. In combination with a cultivator having a frame and a plurality of cultivating gangs, a turner attachment comprising U-shaped turning means adapted at its midportion to be attached to the forward part of the cultivator frame, a turning means hingedly connected to each of the free ends of said U-shaped turning means, and tie links connecting said last mentioned turning means to the cultivator gangs.

2. A device as defined by claim 1, characterized by the addition of shields connected to the rear ends of the U-shaped means and extending over the hinged connections.

In witness whereof, I have hereunto affixed my signature.

ALONZO L. STEWART.